US011113478B2

(12) United States Patent
Wallenfelt

(10) Patent No.: US 11,113,478 B2
(45) Date of Patent: Sep. 7, 2021

(54) RESPONSIVE DOCUMENT GENERATION

(71) Applicant: Patomatic LLC, Excelsior, MN (US)

(72) Inventor: Brian P. Wallenfelt, Excelsior, MN (US)

(73) Assignee: Patomatic LLC, Excelsior, MN (US)

( * ) Notice: Subject to any disclaimer, the term of this patent is extended or adjusted under 35 U.S.C. 154(b) by 160 days.

(21) Appl. No.: 16/412,938

(22) Filed: May 15, 2019

(65) Prior Publication Data

US 2019/0354584 A1 Nov. 21, 2019

Related U.S. Application Data

(60) Provisional application No. 62/671,633, filed on May 15, 2018, provisional application No. 62/781,157, filed on Dec. 18, 2018.

(51) Int. Cl.

| | | |
|---|---|---|
| *G10L 17/24* | (2013.01) | |
| *G06F 13/00* | (2006.01) | |
| *G06F 40/35* | (2020.01) | |
| *G06K 9/00* | (2006.01) | |
| *G06F 3/0482* | (2013.01) | |
| *G06F 40/205* | (2020.01) | |
| *G06F 40/289* | (2020.01) | |
| *G06Q 50/18* | (2012.01) | |

(52) U.S. Cl.
CPC ............ *G06F 40/35* (2020.01); *G06F 3/0482* (2013.01); *G06F 40/205* (2020.01); *G06F 40/289* (2020.01); *G06K 9/00469* (2013.01); *G06Q 50/184* (2013.01)

(58) Field of Classification Search
CPC ................................. G06F 17/24; G10L 13/04
See application file for complete search history.

(56) References Cited

U.S. PATENT DOCUMENTS

| | | | | |
|---|---|---|---|---|
| 6,065,026 A | * | 5/2000 | Cornelia | G06F 40/166 |
| | | | | 715/202 |
| 9,672,827 B1 | * | 6/2017 | Jheeta | G10L 15/32 |
| 2002/0178190 A1 | * | 11/2002 | Pope | G06F 16/972 |
| | | | | 715/234 |
| 2004/0230890 A1 | * | 11/2004 | Fukuda | G06F 40/20 |
| | | | | 715/248 |
| 2006/0074672 A1 | * | 4/2006 | Allefs | G10L 13/04 |
| | | | | 704/258 |
| 2016/0196250 A1 | * | 7/2016 | Allen | G06F 16/215 |
| | | | | 715/230 |
| 2016/0292154 A1 | * | 10/2016 | Campbell | G06Q 10/06 |

(Continued)

*Primary Examiner* — Shreyans A Patel
(74) *Attorney, Agent, or Firm* — Merchant & Gould P.C.

(57) ABSTRACT

Systems, devices, methods, computer-readable storage media, and electronic apparatuses for responsive document generation are provided. An example system includes at least one processor, and memory storing instructions. When executed by the at least one processor, the instructions may cause the system to generate response options based on a document section of a correspondence document. The instructions may also cause the system to generate a user interface with a user-actuatable selection input associated with at least some of the response options. The instructions may also cause the system to receive, via the user-actuatable selection input of the user interface, a user input to select a response option and generate a response document based on the received user input.

20 Claims, 8 Drawing Sheets

(56) References Cited

U.S. PATENT DOCUMENTS

| | | | |
|---|---|---|---|
| 2019/0042551 A1* | 2/2019 | Hwang | G06F 40/216 |
| 2019/0147838 A1* | 5/2019 | Serletic, II | G10H 1/368 |
| | | | 704/260 |
| 2019/0354584 A1* | 11/2019 | Wallenfelt | G06F 40/216 |

* cited by examiner

RESPONSIVE DOCUMENT GENERATION

CROSS-REFERENCE TO RELATED APPLICATIONS

This application claims priority to U.S. Provisional Application No. 62/671,633, titled RESPONSIVE DOCUMENT GENERATION and filed on May 15, 2018, and U.S. Provisional Applications No. 62/781,157, titled RESPONSIVE DOCUMENT GENERATION and filed on Dec. 18, 2018, the entire content of which are hereby incorporated herein by reference.

BACKGROUND

People often use computing devices to prepare various types of documents. The document may include content words that are arranged in free-form text sections, tables, lists, outlines, or other formats. Preparing the documents may include composing, editing, and formatting steps. For example, a person may use a word processing application to perform these tasks. Word processors typically provide a what-you-see-is-what-you-get (WYSIWYG) user interface in which content is input one character at a time (e.g., via striking keys on a keyboard). Words, sentences, and paragraphs are formed by sequentially inputting the characters therein. Formatting can be applied to the entered content using menu options. Word processors provide great flexibility to prepare and customize many types of documents. However, using a word processor to prepare documents in this manner can be very tedious, time-consuming, and error-prone. When content is entered one character at a time, typographic errors may be quite common. Formatting a document in a desired manner using word processor can be unintuitive.

SUMMARY

In general, this disclosure includes systems and methods for generating responsive documents. In a non-limiting example, systems and methods for generating documents that are responsive to correspondence from a governmental agency, such as a patent office are disclosed.

One aspect is a method comprising: generating response options based on a document section of a correspondence document; generating a user interface with a user-actuatable selection input associated with at least some of the response options; receiving, via the user-actuatable selection input of the user interface, a user input to select a response option; and generating a response document based on the received user input.

Another aspect is a method comprising: generating response options based on the identified document section; generating a user interface with a user-actuatable selection input associated with at least some of the response options; receiving, via the user-actuatable selection input of the user interface, a user input to select a response option; and responsive to receiving the user input to select a response option, causing the user interface to display a user input field that is identified based on the selected response option; receiving a field value user input, via the user input field; and generating a response document based on the received user input and field value user input.

Yet another aspect is a method comprising: generating response options based on a document section of a correspondence document based on response options from a data store of response options, the data store including response options that were generated by: dividing response documents of a corpus of response documents into response sections; normalizing the response sections; clustering the response sections into a plurality of clusters. The method may further comprise: selecting example response options to represent each cluster of the plurality of clusters; generating a user interface with a user-actuatable selection input associated with at least some of the response options; receiving, via the user-actuatable selection input of the user interface, a user input to select a response option; and generating a response document based on the received user input.

The details of one or more implementations are set forth in the accompanying drawings and the description below. Other features will be apparent from the description and drawings, and from the claims.

DETAILED DESCRIPTION

This description relates to generating responsive documents. The generated documents may be responsive to correspondence from a government agency, such as a patent office. For example, implementations may generate a responsive document that responds to an office action issued by a patent office for a patent application. An office action is a type of correspondence from a patent office that indicates and explains actions taken by the patent office with regard to a specific patent application. For example, an office action may identify various issues with a patent application that have caused the patent office to object to or reject aspects of a patent application. Typically, a patent office will not issue a patent until all of the identified issues with a patent application have been satisfactorily resolved.

Although most of the examples described herein relate to generating responses to office actions for patent applications, some implementations relate to generating other types of documents too. For example, some implementations may be used to generate documents in response to litigation documents received from an adverse party. Examples of such documents include but are not limited to interrogatories and discovery requests.

Figure 1:
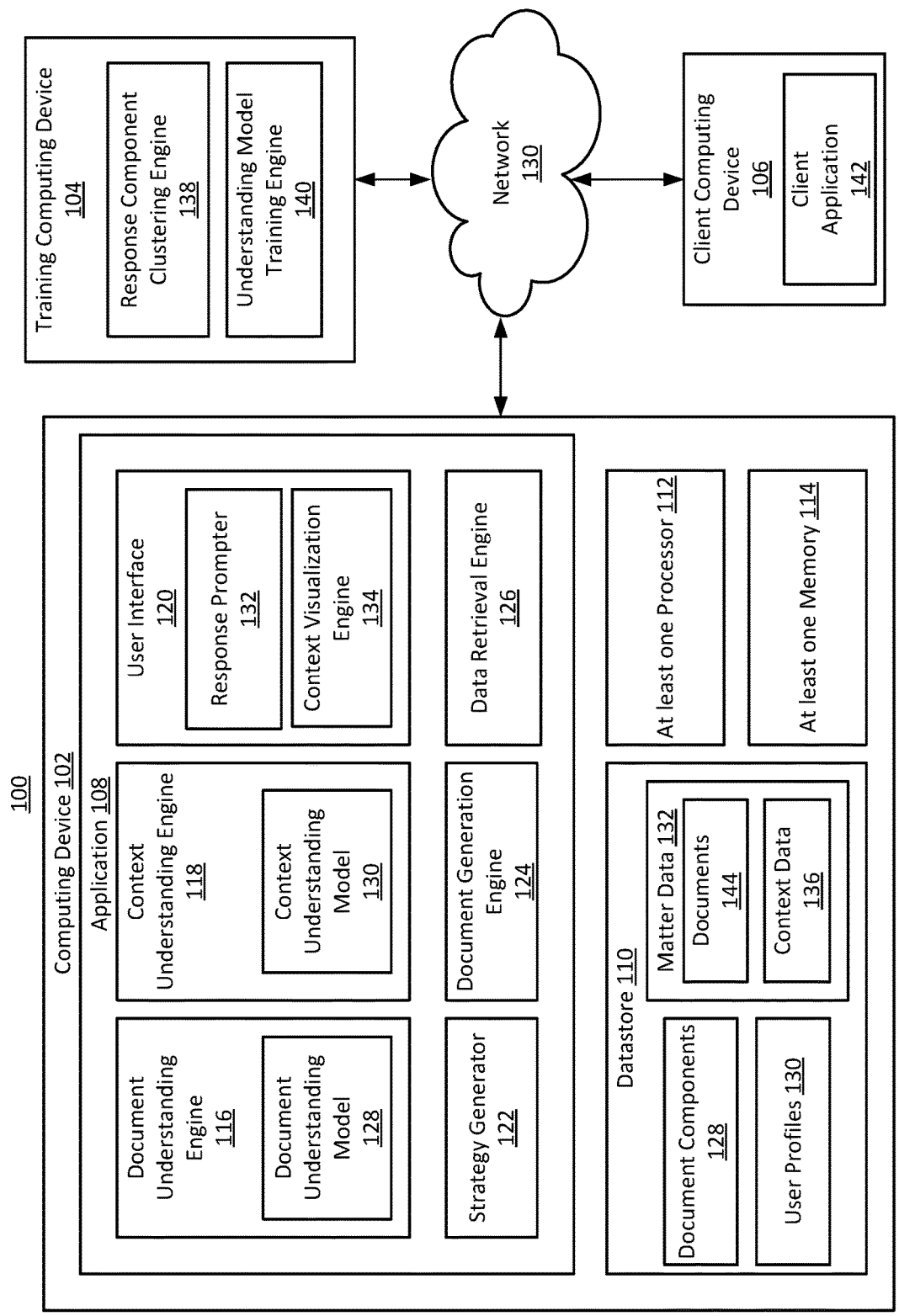
FIG. 1 is a block diagram of a system for generating responsive documents.
Figure 2:
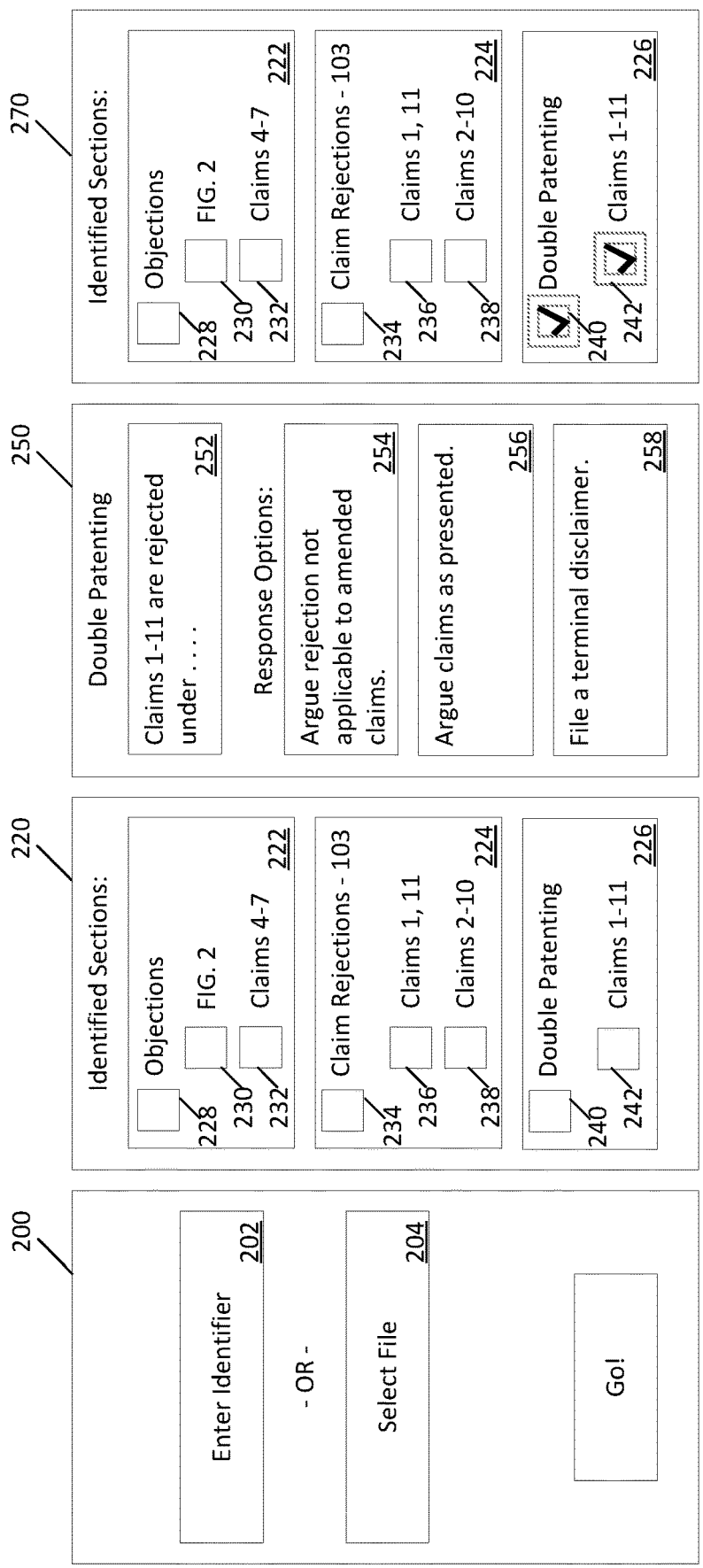
FIGS. 2A-2D are schematic diagrams of example user interface screens that may be generated by implementations of the user interface of FIG. 1.

FIG. 1 is a block diagram of a system 100 for generating responsive documents. The system 100 includes a computing device 102 having an application 108, a datastore 110, at least one processor 112, and at least one memory 114. In some implementations, the system 100 also includes one or more of a training computing device 104 and a client computing device 106. The computing device 102 may communication with the training computing device 104 or the client computing device 106 over a network 130.

The application 108 may be accessed directly by a user of the computing device 102. In other implementations, the application 108 may be running on the computing device 102 as a component of a cloud network where a user accesses the application 108 from another computing device over a network, such as the network 130. For example, the application 108 may be a web-based application that can be accessed from a web browser running on another computing device.

In one implementation, the application 108 is a responsive document generation application. For example, the application 108 may analyze a correspondence document (e.g., an office action from a patent office) using a document understanding model, generate response options, prompt a user to select among the response options, and generate a responsive document based on the selected response options. For example, the application 108 may analyze an office action to identify any rejections and objections in the office action. The application 108 may then determine various response options based on the types of rejections and objections identified in the office action.

The response options may for example include content (and formatting for that content) that is responsive to a specific issue in the office action. In some implementations, the response options are generated by populating fields in a template with data extracted from multiple sources, such as the office action, a patent application to which the office action relates, previous correspondence between the patent office and the applicant (e.g., documents from the file history for the patent application such as previously filed claim amendments and responsive documents, previous office actions, interview summaries, etc.), and references cited in the office action.

The application 108 may then present (or cause to be presented) those response options to the user (e.g., on a user interface) so that the user may provide inputs to specify an appropriate response strategy. The user inputs may include selections from a list of response options. The application 108 may then generate a response document that is consistent with the selected response options. The user interfaces and technologies described herein can help users produce a complete response document much more quickly than conventional word processing systems and with fewer errors. For example, by selecting response options to generate and format content rather than inputting content one letter at a time, users make fewer mistake (e.g., users have no opportunity to make typographical errors).

In some implementations, the application 108 includes a document understanding engine 116, context understanding engine 118, user interface 120, strategy generator 122, document generation engine 124, and data retrieval engine 126.

The document understanding engine 116 may include a document understanding model 128 that can be used to analyze a correspondence document (e.g., an office action). In some implementations, the document understanding model 128 includes a combination of a regular expression parsing engine and a machine learning model that is trained to identify issues in the correspondence document and extract data that can be used to generate response options. The document understanding model 128 may be generated by the understanding model training engine 140 using a corpus of training data.

For example, the regular expression parsing engine may include one or more regular expressions to recognize commonly used headers, phrases, and sentence structures that are associated with specific issues. The regular expression parsing engine may include one or more regular expressions that define a specific pattern of text. The pattern may, for example, be defined based on a combination of literal characters and character types, such as the literal characters 'claim' followed by a numeric character type. The regular expression may define various relationships between the characters and operations that specify that types of text strings that will match the regular expression (such as positional relations, number of times a character or character type is repeated, Boolean operations, etc.). The regular expression parsing engine may then use the regular expression to identify portions of the correspondence document that match the specified pattern. The regular expressions may also define fields that correspond to portions of the pattern. A value for the field is then determined based on a corresponding portion of the matching text.

For example, the regular expression parsing engine may include a regular expression configured to match phrases similar to "Claim/s ##is/are rejected under 35 U.S.C. § 102(a) over . . . ." The regular expression parsing engine may then use this example regular expression to parse a correspondence document and identify matching text in the correspondence document. The text that matches the regular expression may then be used to generate an issue data structure that identifies a rejection under section 102. The issue data structure may include one or more fields that were extracted from the matching text using the regular expression. For example, the issue data structure may store one or more of the following: a list of one or more claims, a list of one or more references (which may also include citations to portions of the reference), a textual explanation of the rejection, and a location within the correspondence document where the matching text was found. Of course, this is just an example and the regular expression may be configured to recognize different phrases and may extract fields from the recognized phrases (e.g., the claim numbers, the statutory citation, the references cited).

Implementations may also include a regular expression configured to identify pincites to references, statements regarding allowable subject matter, acknowledgements that a reference fails to teach a claim element, or other parts of the response. The regular expression parsing engine may also include regular expressions to extract various fields from the correspondence document, such as an application number, applicant name, inventor name, title, examiner's name, group art unit, attorney docket number, filing date, mailing date, or other fields.

In some implementations, the regular expression parsing engine is configured to recognize headers within a correspondence document. For example, the regular expression parsing engine may use a set of regular expressions that are defined to identify header sections of a correspondence document. These regular expressions may include patterns that are expected to occur in a header of the correspondence document. In some implementations, the regular expressions may be configured to identify markup text used to format the header sections (e.g., if the correspondence document is defined using a markup language). The regions of textual content between the headers may then be extracted and treated as sections of the correspondence document. The textual values of the recognized headers may also be used to classify the section of the correspondence document (e.g., to determine a section type). Based on the classification, a specific type of regular expression may be selected and used to parse the textual content within the section. In some implementations, the classification may also be used to select a machine learning engine to analyze the content within the section.

The machine learning engine may include a neural network system such as a recurrent neural network (RNN) model. For example, the RNN model may be trained on a corpus of training sequences. The training sequences may include sequences of characters representing issues the model should recognize. The training sequences may include a classification label at the end of the sequence. The RNN can then be trained to predict the next character in a sequence based on previous characters in the sequence.

When the RNN predicts one of the classification labels as the next character in a sequence, the sequence can be classified based on the classification label. Similarly, a long short-term memory (LSTM) is used to classify sequences in some implementations.

Additionally, some implementations include a bidirectional RNN or bidirectional LSTM for classifying sequences. The training corpuses for these implementations may also include sequences that have classification labels at the beginning of the sequence. Using these labels, some implementations train a bidirectional RNN or bidirectional LSTM to annotate the beginning and end sections or relevant phrases that indicate issues.

Some implementations normalize data in the correspondence document before analyzing the document. For example, citations to references may be replaced with a predefined character sequence (e.g., "Jones et al." may be replaced with "<REF>"). Citations to references may be recognized using one or more regular expressions that identifies commonly used citation formats, machine learning modules that are trained to recognize citations, or lists of references generated from other correspondence documents (e.g., lists of references cited by the examiner, list of references submitted by patent applicants, references cited in previous correspondence documents associated with the patent application). The entries (or portions of the entries) may be used to search and replace those entries within the correspondence document. Some implementations also normalize data by replacing lists of claim numbers with a common predefined character sequence. After normalizing the data, any annotations or classifications generated by the document understanding engine 116 may be mapped back to the correspondence document prior to normalization.

In some implementations, defined character sequences that are frequently included in multiple correspondence documents may be removed from the correspondence document before analyzing the correspondence document with the machine learning engine or regular expression processing engine. For example, office action correspondence documents may include statutory quotations. These statutory quotations may be identified and removed from the correspondence document before the correspondence document is analyzed.

In some implementations, the statutory quotations are used to identify sections of the correspondence document. For example, some implementations are configured to classify a section of a correspondence document as a rejection under 102 based on identifying a quotation from 35 U.S.C. § 102. These defined character sequences may be stored in a database that is populated based on a statutory language, regulation language, guidance document language (e.g., from the Manual of Patent Examining Procedure), or by evaluating a corpus of correspondence documents to identify common sections.

Some implementations analyze a correspondence document on a page-by-page basis. In other words, each page of the correspondence document may be analyzed independently. The section classifications can then be mapped to the pages. In some implementations, pages in which no sections are identified/classified may be flagged as potentially being incorrectly analyzed. In some implementations, other portions of the correspondence document (e.g., paragraphs, sentences, words, etc.) may be flagged. These sections that are not identified as being part of a section may be referred to as unidentified sections. When flagged, these unidentified sections may be analyzed using a different technique or flagged for user review via a user interface. In some implementations an alternative parsing method may be selected for the unidentified sections. The alternative parsing method may be identified based on the length of the unidentified sections.

Some implementations analyze the pages both independently (e.g., treating each page as a separate sequence of text) and together (e.g., concatenating the text from each of the pages to form a single sequence of text). These implementations may then compare results to identify discrepancies which may be flagged for user review. Anomaly detection techniques may also be used to identify sections that have an anomalous length (e.g., number of pages, lines, words, etc.) or are otherwise anomalous (e.g., as compared to similar issues in a training corpus).

Some implementations perform sequence alignment of a known textual sequence to the text from the correspondence document. The known textual sequence may be from a separate document that the correspondence document is associated with. For example, the known textual sequence may be the text from a claim in a patent application (or from other documents, such as claim amendments that have been filed), which may be aligned to the text from an office action correspondence document. This alignment may be performed using various sequence alignment techniques, including but not limited to dynamic programming techniques. Some implementations use the Needleman-Wunsch algorithm, the Smith-Waterman algorithm, or the basic local sequence alignment technique (BLAST) to perform this alignment. In some implementations, the text from each of the claims of a patent applications may be aligned to the text from the office action correspondence document. A portion of the correspondence document that is aligned to the known textual sequence may be known as an alignment region. The alignment region may include at least some of the known textual sequence and some insertions (e.g., text that is not part of the known textual sequence but is included in the alignment region such as between portions of the known textual sequence). The identified alignment regions can be used to identify sections relating to particular claims. Some implementations compare the sections identified using sequence alignment with the sections identified using other techniques.

Additionally, in some situations, the alignment result will be imperfect. For example, an office action correspondence document may include some or all of the text of claim with one or more insertions in the middle of the claim text. These insertions may be citations to references or explanatory remarks. These insertions within an aligned sequence may be extracted and associated with a claim or elements of a claim. These insertions may be displayed by the context visualization engine 134 to help a user understand the content of the correspondence document. In some implementations, these insertions may be displayed separately or outside of the context of the correspondence document. Some implementations may include additional relevant information that is located based on the insertion.

For example, if the insertion includes a citation to a paragraph in a published patent application, at least some of the textual content of that paragraph may be displayed. As another example, if the insertion includes a quotation from a published patent application, preceding and following textual content may be displayed with the quotation to provide additional context for the user. Additionally, other sections of the quoted published patent application that appear to be relevant may also be identified and displayed (e.g., based on sharing common keywords or part numbers). In some implementations, these insertions are displayed as or with a uniform resource locator or hyperlink to a webpage that includes the patent application.

Neural networks are computational models used in machine learning that are made up of nodes organized in layers with weighted connections. In some implementations, the nodes of a layer are represented as a matrix of values for the layer. The values for each layer may be calculated based on the values of the previous layer and the weighted connections. The first layer of a neural network receives the input values. For example, a first layer of a neural network may receive values corresponding to characters in the correspondence document (or portions of the correspondence documents such as sections as identified above). In some implementations, words are used as inputs to the neural network. The words may be encoded as vectors using various models, such as Word2vec.

The neurons in the first layer will perform a function on those input values to generate output values. For example, the function may be based on combining multiple of the input values (e.g., characters, words, vector-encoded words) based on weighting parameters. In some implementations, the weighting parameters may be different for each neuron in the layer. A layer in a neural network may be fully-connected to the previous layer (or input). In a fully-connected layer, each value in the layer is calculated as an independently adjusted weighted combination of each value in the previous layer. In some implementations, at least some of the layers are not fully-connected or some of the inputs in a fully connected layer are assigned a weight of zero (e.g., so that specific input has no impact on the output).

Training a neural network uses training examples, each example being an input and a desired output, to determine, over a series of iterative rounds, weighting parameters for the connections between layers that increase the likelihood that the neural network will provide the desired output given the input. During each round, the weighting parameters are adjusted to address incorrect output. Once trained, the neural network can be used to predict an output based on a provided input.

A convolutional neural network (CNN) is a neural network in which at least one of the layers of the neural network is a convolutional layer. A convolutional layer is a layer in which the values of a layer are calculated based on applying a kernel function to a subset of the values of a previous layer. Training the neural network may involve adjusting weights of the kernel function based on the training examples. Typically, the same kernel function is used to calculate each value in a specific convolutional layer. Accordingly, there are far fewer weights that must be learned while training a convolutional layer than a fully-connected layer (e.g., a layer in which each value in a layer is a calculated as an independently adjusted weighted combination of each value in the previous layer) in a neural network. Because there are typically fewer weights in the convolutional layer, training and using a convolutional layer may require less memory, processor cycles, and time than would an equivalent fully-connected layer.

A recurrent neural network (RNN) is a neural network in which at least one of the layers of the neural network is a recurrent layer. A recurrent layer is a layer in which the values of a layer are calculated based on a previous output of that same layer. In some implementations, the textual content (e.g., characters, words, vector-encoded words) of a correspondence document is fed into an RNN sequentially. The RNN can be trained to make decisions based on earlier portions of the textual content that are no longer being provided as input to the RNN.

The document understanding model 128 may include one or more neural network models that are trained as described above to recognizes, classify, or annotate the correspondence document.

The context understanding engine 118 uses a context understanding model 130 to understand context related to a correspondence document. For example, the context understanding model may analyze the file history of a patent application to determine various information about the application such as the number of times claims have been rejected and the different references that have been cited. In some implementations, the context understanding engine 118 may analyze a patent application associated with a correspondence document to provide context for terms in the claims and identify potential claim amendments.

In some implementations, the context understanding engine 118 may identify previously filed claim amendments and associate those amendments with specific references that were cited. In some implementations, the previously filed claim amendments are also used to generate a pending claim set that represents that claims after all amendments have been applied. The previously filed claim amendments may be extracted from textual representations of previously filed responsive documents.

The previously filed claim amendments may also be extracted from other sources, such as Portable Document Format (PDF) files. For example, a PDF file may include a previously filed response that has claim amendments for an application. This PDF may be retrieved, for example, from a computer system provided by a patent office. The PDF of a previously filed responsive document may include images of each page of the responsive document. The PDF may or may not also include a textual representation of the content of the responsive document.

In some implementations, optical character recognition (OCR) techniques are applied to the PDF files to generate a textual representation of the responsive document from the images of the pages. The textual representation may be generated for all pages of the responsive document or only some of the pages (e.g., pages identified as including claims). For example, OCR techniques may evaluate regions of the images to determine whether and which character is represented in the region of the image. In some implementations, a sliding window of one or more specific region sizes is moved across the image and the content of the window is evaluated. For example, a neural network may determine statistical values representing the likelihood that the window includes one or more specific characters at each position in the image. In this manner, the characters (and eventually textual content) of the image are extracted.

Some responsive documents may include claim amendments that are represented using a markup syntax. For example, insertions in a claim may be underlined and deletions to a claim may be surrounded by double brackets or struck-through (a horizontal line that passes approximately through the middle of the text that is to be deleted). In some implementations, the textual representation of the claims may include both a clean (or current) and a marked-up version of the claim text. The clean version of the claim text may be generated by removing text that the markup indicates as a deletion (e.g., text that is struck-through or surrounded by double-brackets). Generating the clean version of the claim text may also include removing any indicators of insertions from the marked-up claim text (e.g., the underlines may be removed).

Various implementations use various techniques to identify the markup from images in PDF files. For example, the OCR technique may identify characters in the image that are underlined or struck-through as the correct underlying character with a specific text effect (or text decoration) applied. The OCR technique may then store information about each of the recognized characters that identifies the text effects that are applied.

In some implementations, the text effects, especially strikethrough, may make recognition of the underlying characters using existing OCR techniques challenging or inaccurate. In some implementations, an OCR that uses a machine learning model that is specifically trained to recognized text effects that may be used to extract text from the images of the pages. For example, the OCR technique may initially treat the characters with text effects as separate and different characters than the characters without the text effects (e.g., "A" with underline, "A" with strikethrough, and "A" without text effect may initially be recognized as three distinct characters). Characters that have text effects are examples of annotated characters and characters that do not have text effects are examples of unannotated characters. For example, the machine learning model may initially recognize three times as many characters as conventional OCR techniques. The machine learning model may be trained using a corpus of images of text that include strikethrough and underline text effects. The corpus may be generated by, for example, applying text effects to a variety of texts. In some implementations, the machine learning model may be specifically trained for fonts that are used or likely to be used in the PDF documents.

In some implementations, a pre-processing step may be applied to identify one or more of strikethrough and underline text effects and remove those effects from the image. The strikethrough and underline text effects may be identified using image processing techniques that recognize horizontal lines or substantially horizontal lines that exceed a specific length threshold.

Once identified, the locations of the horizontal lines can be stored (e.g., for later association with underlying characters) and the horizontal lines can be removed from the images. The pixels of the identified horizontal lines may be changed to white (or another background color) pixels in the images. The pixels of the identified horizontal lines may also be changed to pixel values that are determined from the surrounding content (e.g., so that the underlying characters are restored without the text effect). For example, at places where non-horizontal lines (or curves) intersect with a horizontal line that is being removed, a darker pixel value may be retained (i.e., the pixel value of the horizontal lines being removed will only be changed to white at locations that do not intersect with a non-horizontal line or curve).

Once the identified horizontal lines have been removed from the image, the image may be processed using OCR techniques to identify the underlying text. The identified text at the locations in which the horizontal lines were removed may be associated with the corresponding text effect. The text effect may be determined based on the vertical position of the horizontal line with respect to the characters (e.g., an underline text effect is determined when the horizontal line is positioned below or near the bottom edge of the characters and a strikethrough text effect is determined when the horizontal line is positioned near the middle (vertically) of the characters). The text effects are examples of amendment indicators. In some implementations, an amendment indicator type (e.g., insertion, deletion) may be determined based on the relative vertical position of the horizontal line with respect to the text.

In some implementations, horizontal lines are only identified and removed when the horizontal lines are in a specific vertical position with respect to the text. For example, the locations of sequences of text may first be identified use OCR or image processing techniques. Then, horizontal lines are identified in the image. The horizontal lines that could correspond to underlines or strikethroughs based on the vertical positions of the horizontal lines with respect to the identified locations of the sequences of text are removed (e.g., as described above). The image may then be processed using OCR techniques to recognize the underlying text.

In some implementations, the horizontal lines in vertical positions that correspond to strikethroughs are expanded to fully occlude the underlying text. Expanding the horizontal lines may include overlaying a black rectangle over the line of text in the image at the location of the horizontal line. In some implementations, a white (or other background color associated with the image in the correspondence document) is overlaid above the text in the image at the location of the horizontal line to essentially delete the text. In these implementations, this text may not be recognized at all when processed using OCR techniques.

In some implementations, a machine learning model may be used to remove the text effects. For example, an encoder-decoder based machine learning model, such as an encoder-decoder based CNN, may be used to remove text effects. The encoder-decoder based CNN may include layers that encode an image region (e.g., selected from the image of the page with a sliding window) containing a character with text effects into an intermediate representation and layers that decode the intermediate representation into a replacement image for the region that does not include the text effects.

The context understanding engine 118 may also analyze references that have been cited in an office action. For example, the context understanding engine 118 may generate a summary of a reference (or the cited parts of a reference). The context understanding engine 118 may also compare a cited reference to a patent application to identify portions of the patent application that are not included in the cited reference. These identified portions may be referred to as dissimilar portions and may be used to suggest response strategies or to generate response options.

For example, the context understanding engine 118 may generate word embeddings, using for example word2vec, to encode a cited reference and a patent application and then may identify encoded words or groups of words in the patent application that are sufficiently different from the encoded words in cited reference. Word2vec may be used to assign vectors to words based on semantic understand and context so that words that have similar meanings are encoded with similar vectors. In this case, the context understanding engine 118 may identify the encoded word vectors from the patent application that satisfy a difference criterion with respect to the encoded words of the cited reference. The encoded word vectors (or word embeddings) may be used to identify dissimilar portions of the patent application. Similar techniques may be used to compare the patent application to multiple cited references to identify dissimilar portions of the patent application with respect to the multiple cited references.

The context understanding engine 118 may include a regular expression engine or machine learning engine. The context understanding engine 118 may include components similar to those discussed above with respect to the document understanding engine 118.

The user interface 120 presents information to the user. The user interface 120 may also present user interface controls and receive user inputs via those user interface options. The user interface 120 may include a response prompter 132 and a context visualization engine 134. The response prompter 132 may include response options a user can select to generate a response to a correspondence document. The response prompter 132 may also present a checklist or tree of sections (or issues) in a correspondence document for which a response is needed.

The strategy generator 122 generates a response strategy based on user inputs. The strategy generator 122 may also generate, at least in part, the response strategy based on user preferences or previous practices that are stored in the user profiles 130. In some implementations, the strategy generator 122 may generate a strategy based on a user profile for a user that is different that the user operating the system. For example, a user may use the application 108 to prepare a responsive document for another user. In this situation, some implementations will access the user profile for that other user to determine the strategy. The document generation engine 124 generates a responsive document based on the response strategy generated by the strategy generator 122. The generated document may be in a word processing format, such as a Microsoft® Word® format, or another format such as an Adobe® PDF format.

The datastore 110 stores data for use by the application 108. In some implementations, the datastore 110 includes document components 128, user profiles 130, and matter data 132.

The document components 128 are usable to generate response options for a correspondence document. The data store 110 may store several document components 128 that can be used to generate response options for different types of issues (e.g., rejections under 101, rejections under 102, rejections under 103, claim objections, etc.) in correspondence documents. In some implementations, multiple document components are stored for the same type of issue that implement different response strategies (argue, amend, traverse, cancel, etc.). The document components 128 may be associated with specific users.

The textual content may include field indicators that will be populated with data about the patent application or the correspondence document. In some implementations, the textual content includes rules that are applied to data when the response option is generated. An example rule formats a list of claim numbers in a consistent manner. The document components 128 may be generated by the training computing device 104 based on analyzing a corpus of responses. In some implementations, the corpus of responses is a user-specific corpus of responses.

The user profiles 130 store information about users of the application 108, such as drafting preference. The user profiles 130 may be used to identify response options. The user profiles 130 may also be used to determine an order to list the response options when prompting a user (e.g., the response options may be listed in order determined by how frequently a user selects the option).

The matter data 132, may include documents 144 and context data 136. The documents 144 may include correspondence documents and response documents generated by the application 108. The context data 136 may include documents related to the correspondence documents such as file history documents and cited references.

The training computing device 104 may include a response component clustering engine 138 and an understanding model training engine 140. The response component clustering engine 138 cluster components of responses to identify similar components. These similar components may then be used to generate the document components 128.

In some implementations, a training corpus of training response documents may be analyzed by the response component clustering engine 138. First, the training documents may be divided into sections based on identify keywords or phrases. The document may also be divided into sections using a machine learning model similar to those discussed with respect to the document understanding engine 116. The sections may be classified in a manner similar to that discussed above too. Then the sections with the same classification sections may be clustered based on similarity to each other.

For example, K-means clustering may be used to perform the clustering. Then an example section may be selected for each cluster and used to generate a document component. In some implementations, the sections are modified to normalize certain data/phrases (e.g., citations to references). The sections may also be encoded using Word2vec before clustering. The clustering may be performed on user-specific corpuses of response documents.

The understanding model training engine 140 trains the document understanding model 128 and the context understanding model 130. For example, the understanding model training engine 140 may use a corpus of training example to train the models as described above.

The client computing device 106 may include a client application 142. The client application 142 may communicate with the application 108 over the network 130 to allow a user to generate a responsive document. For example, the client application 142 may be a web browser that communicates with an application 108 that implements a web service.

The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network. Similarly, the training computing device 104 and the client computing device 106 may be implemented as one or more servers, desktop computers, laptop computers, mobile devices such as a tablet devices or mobile phone devices, as well as other types of computing devices.

The at least one processor 112 may represent two or more processors in the computing device 102 executing in parallel and utilizing corresponding instructions stored using the at least one memory 114. Additionally, the at least one processor may include one or more central processing units (CPUs) or one or more graphics processing units (GPUs). In some implementations, the at least one memory 114 includes a non-transitory computer-readable storage medium. Of course, similarly, the at least one memory 114 may represent one or more different types of memory utilized by the computing device 102. In addition to storing instructions, which allow the at least one processor 114 to implement the application 108 and its various components, the at least one memory 114 may be used to store data, such as the datastore 110 and various documents and associated data generated by the application 108.

Although not shown in FIG. 1, the training computing device 104 and the client computing device 106 also each include at least one processor and at least one memory. The at least one memory, for example, stores instructions that, when executed by the at least one processor, cause the training computing device 104 or the client computing device 106 to implement the response component clustering engine 138, the understanding model training engine 140, or the client application 142.

The network 130 may be implemented as the Internet but may assume other different configurations. For example, the network 130 may include a wide area network (WAN), a local area network (LAN), a wireless network, an intranet, combinations of these networks, and other networks. Of course, although the network 130 is illustrated as a single network, the network 130 may be implemented as including multiple different networks.

Although FIG. 1 shows the response component clustering engine 138, understanding model training engine 140, and the client application 142 as components of different computing devices, in some implementations the client application 142 or the response component clustering engine 138 and the understanding model training engine 140 may be included on the computing device 102.

Referring now to FIGS. 2A-2D, schematic diagrams of example user interface screens that may be generated by the user interface 120 are shown. In some implementations, user interface screens generated by the user interface 120 are transmitted to and displayed by the client application 142.

FIG. 2A is a schematic diagram of an example user interface screen 200 that may be used to start the process of generating a responsive document. The user interface screen 200 includes an identifier entry field 202 and a file select field 204.

The identifier entry field 202 may be a text entry field in which a user input may be received for use as an identifier. The user input may for example be used to identify a matter or correspondence document for which a response document will be generated.

In some implementations, the identifier uniquely identifies a matter and then the matter is used to identify one or more documents for which a response could be generated. For example, the identifier may be a patent application number, an attorney matter number (i.e., a docket number), or another type of identifier. In some implementations, the identifier uniquely identifies a document. For example, the identifier may be a primary key to a record in a database. In some implementations, the identifier entry field may be configured to receive multiple values to identify a matter or correspondence document (e.g., an application number and a date to identify a correspondence document).

The identifier may specify a matter that may be associated with one or more documents for a which a response may be generated. In at least some of these implementations, a correspondence document may be identified for a matter by date or by analyzing a list of documents associated with the matter. For example, the file history of a matter may be analyzed to identify the most recent document for which a response is required. In some implementations, the file history is analyzed to identify any documents that have not yet had responses filed.

The value entered in the identifier entry field 202 may also be used to retrieve data about a matter or a correspondence document. For example, data about a matter may be retrieved from a web service provided by a docketing system or a system provided by a government agency.

The file select field 204 may be used to select a file. For example, a PDF, XML, .DOC, or .DOCX format file may be selected as a correspondence document. The selected file may then be analyzed to determine various properties of the matter. For example, a patent application number may be extracted from text in the file.

FIG. 2B is a schematic diagram of a user interface screen 220 that may be used during the process of generating a responsive document. In this example, the user interface screen 220 includes correspondence sections 222, 224, and 226. These correspondence sections 222, 224, and 226 may, for example, be generated based on parsing a correspondence document identified using the user interface screen 200. For example, the correspondence sections 222, 224, and 226 may form a tree based on the parsed contents of a correspondence document. For example, each of the correspondence sections 222, 224, and 226 may include one or more issues of a specific type that are identified in the correspondence document.

In this example, the correspondence section 222 is titled "Objections" and includes a section control 228 and subsection controls 230 and 232. The subsection control 230 is titled "FIG. 2." The subsection control 232 is titled "Claims 4-7." The correspondence section 224 is titled "Claim Rejections—103" and includes a section control 234 and subsection controls 236 and 238. The subsection control 236 is titled "Claims 1, 11" and the subsection control 238 is titled "Claims 2-10." The correspondence section 226 is titled "Double Patenting" and includes a section control 240 and a subsection control 242. The subsection control 242 is titled "Claims 1-11."

In some implementations, each of the subsection controls is associated with a specific issue of the type associated with the parent section. In this example, the subsection control 230 is associated with an objection to FIG. 2. In some implementations, the section controls and subsection controls are checkboxes. For example, a checkbox for a subsection may be shown in a cleared state when the associated issue has not been addressed. When the issue has been addressed, the checkbox may then be shown in a set (checked) state. The checkbox for the sections may be shown in a cleared state if any of the subsections are cleared. Once, all subsections are cleared, the section checkbox may be shown in a set (checked) state.

Upon actuation of a subsection control, a user interface may be presented to address the associated issue. An example user interface screen 250 is shown in FIG. 2C. In this example, the user interface screen 250 is associated with the double patenting issue related to claims 1-11 (e.g., the issue associated with subsection 242).

The user interface screen 250 includes a description section 252 and response subsection options 254, 256, and 258. The description section 252 provides information about an issue. For example, the description section 252 may include a portion of text that is extracted from the correspondence document. The response subsection options 254, 256, and 258 may be associated with potential strategies for responding to the associated issue. The response subsection options 254, 256, and 258 may display a textual description of the strategy. In some implementations, the response subsections 254, 256, and 258 display formatted text that is specifically generated to respond to the associated issue in the correspondence document based on the selected strategy. The formatted text may be generated using, for example, a template with fields that are populated using data associated with the matter and extracted from the correspondence document. The template may also be populated with other information the user has provided about the matter or the response, such as how other issues are being addressed (e.g., claim amendments).

In this example, the response subsection option 254 is associated with a strategy of arguing the rejection is not applicable to the claims as amended, the response subsection option 256 is associated with a strategy of arguing the claims as presented, and the response subsection option 258 is associated with a strategy of filing a terminal disclaimer. These are, of course, just examples and other response subsection options are possible as well.

Responsive to the actuation of one of the response subsection options 254, 256, and 258, the actuated response subsection option may be selected for use in generating a responsive document. In some implementations, actuating a response subsection option may also cause the user to be prompted to enter information that will be used to generate the response subsection.

For example, responsive to the actuation of the response subsection option 256, a user input prompt may be provided through which a user can input or select a claim element to use to populate the template associated with the strategy of arguing the claims as presented.

In some implementations, multiple responsive documents may be generated for a single correspondence document. For example, responsive to the actuation of the response subsection option 258, a terminal disclaimer document may be generated in addition to the response document.

FIG. 2D shows an example user interface screen 270. The user interface screen 270 is similar to the user interface screen 220 except that the section control 240 and the subsection control 242 are shown in a completed state (e.g., the associated checkboxes are checked). The user may then actuate another section control or subsection control to address other issues. Once all of the issues are addressed, a response may be generated. In some implementations, a response can be generated before all of the issues are addressed. The response may, for example, include only the addressed issues, use default strategies for the unaddressed issues, or use placeholder text for the unaddressed issues.

In some implementations, user inputs may also be received to reorder sections or subsections. For example, some implementations are configured to receive drag-and-drop inputs to reposition the sections or subsections. Repositioning the sections or subsections may cause the sections or subsections to be reordered in the generated response document. Initially, the sections and subsections may be ordered based on a default order or based on an order determined from the correspondence document.

Additionally, some implementations are configured to receive user inputs to add or remove sections or subsections. For example, a user may select an issue type and a specific issue from a list to add corresponding section controls and subsection controls.

Figure 3:
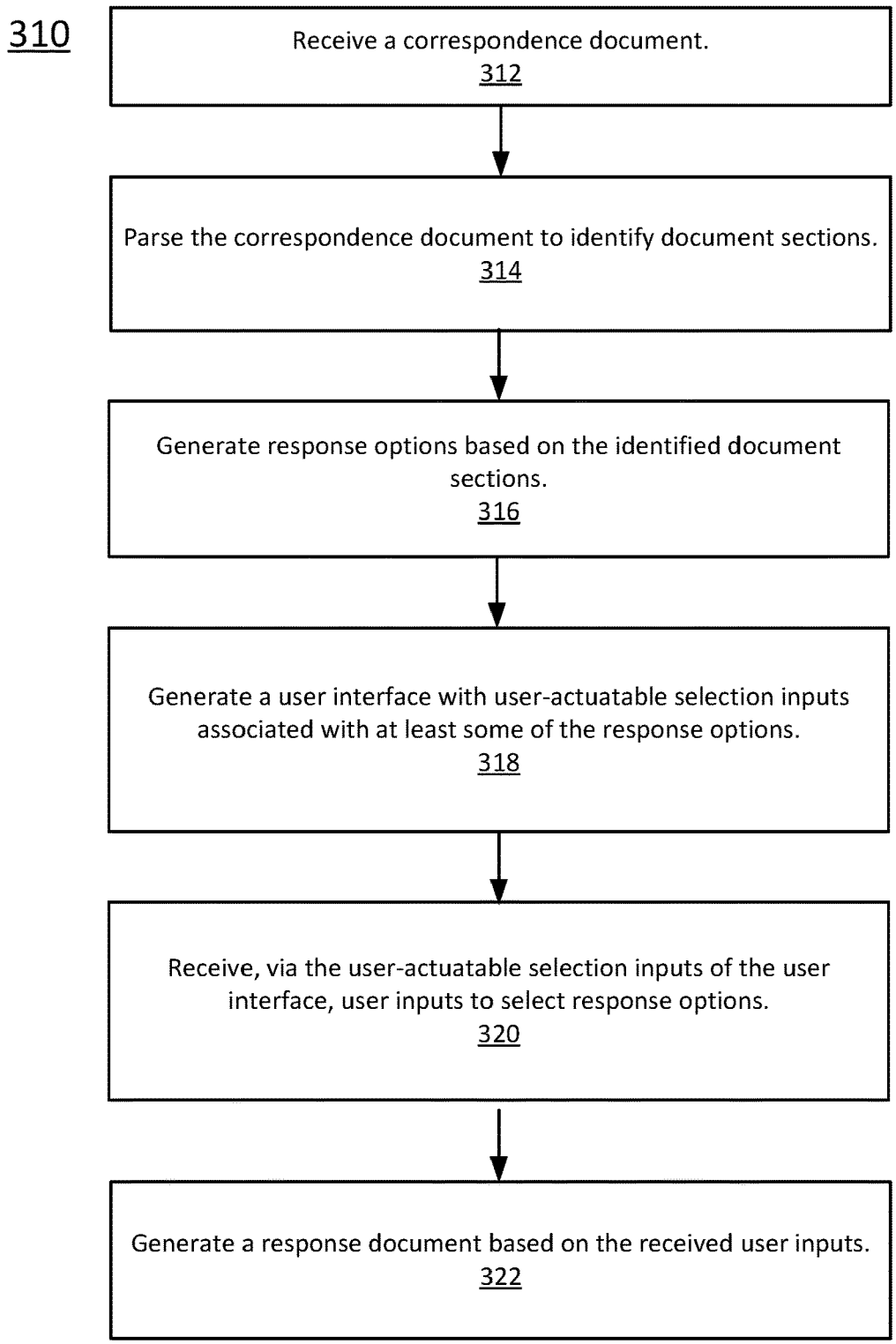
FIG. 3 is a diagram of an example method of generating a response document for a correspondence document that may be performed by implementations of the application of FIG. 1.

FIG. 3 is a diagram of an example method 310 of generating a response document for a correspondence document. The method 300 may, for example, be performed by the application 108.

At operation 312, a correspondence document is received. In some implementations, the correspondence document may include, text, images of text, or any combination thereof. The text may include markup. The correspondence document may, for example, be stored as a file in a compressed or uncompressed format. The correspondence document may be stored in a file system, a database, a server, or otherwise. The correspondence document may be received as a file, or as textual content, or in another manner. In some implementations, the correspondence document is received based on a user providing a file, a uniform resource locator, or an identifier that can be used to retrieve the correspondence document.

At operation 314, the correspondence document is parsed to identify document sections.

At operation 316, response options based on the identified document sections are generated.

At operation 318, a user interface with user-actuatable selection inputs associated with at least some of the response options is generated.

At operation 320, user inputs to select response options are received via the user-actuatable selection inputs of the user interface. In some implementations, each user input received corresponds to a response option for an associated document section. In some implementations, a single user input may be received to select multiple response strategies. For example, a user input may indicate a selection of similar response sections for each of identified sections (e.g., an argue that all issues in the identified document sections are addressed by an amendment). In some implementations, responsive to receiving a user input to select a response option, the user interface may prompt a user regarding whether to apply the selected response option to other identified document sections.

At operation 322, a response document based on the received user inputs is generated. For example, the response document may be generated by combining (or concatenating) multiple response sections that are each generated based on the response options. The response options may be generated based on a template associated with the response option. Multiple templates may be associated with a single response option. In this case, a user profile may be used to select a template to use for the response option. The template may include text and fields. The fields may be populated with data extracted from the correspondence document, from user inputs (e.g., additional user input fields that may be presented in response to receiving a user input selection of a specific response option), or from data extracted from other documents associated with the correspondence document.

Figure 4:
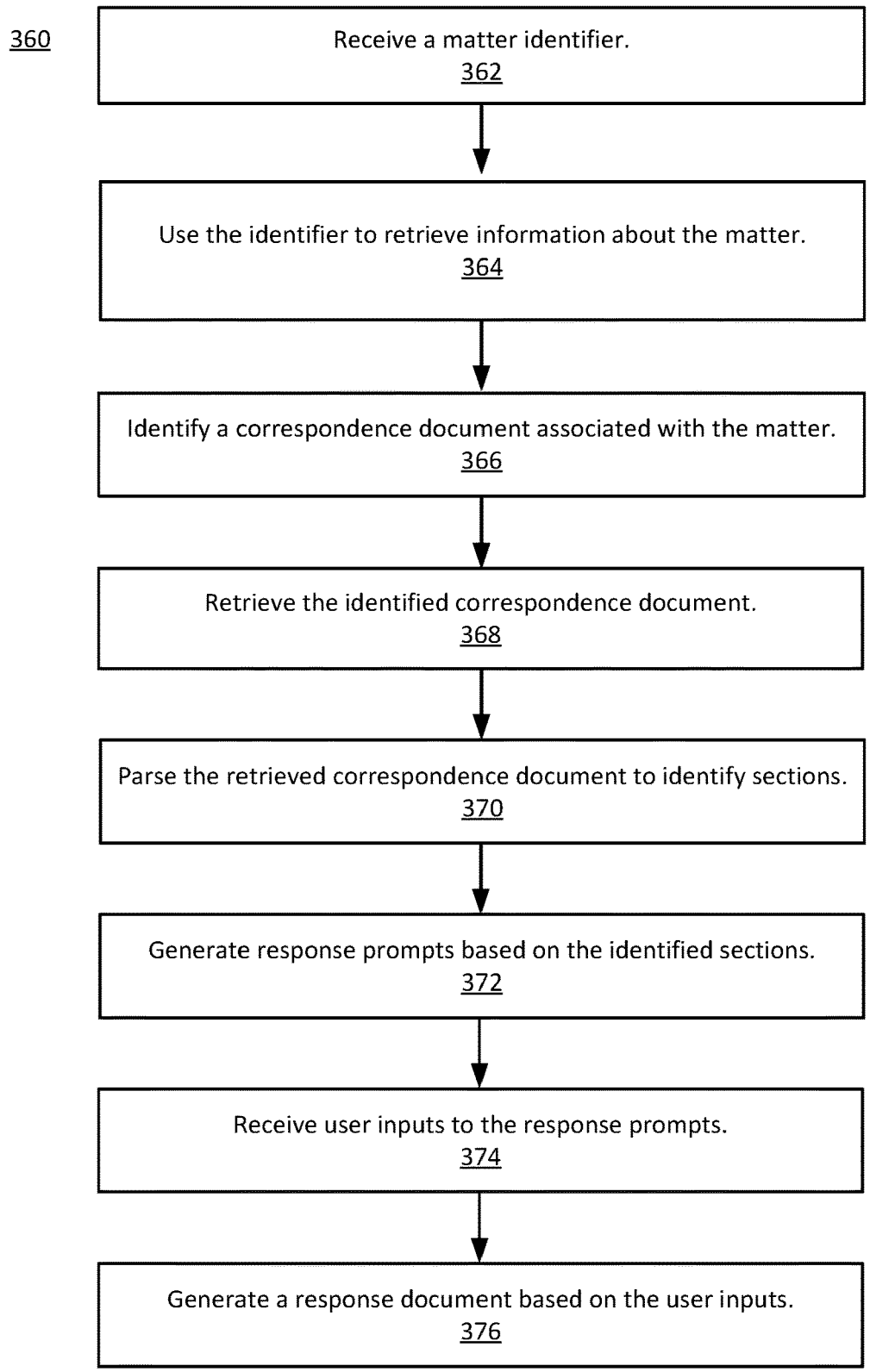
FIG. 4 is a diagram of an example method of generating a response document for a matter that may be performed by implementations of the application of FIG. 1.

FIG. 4 is a diagram of an example method 360 of generating a response document for a matter. The method 360 may, for example, be performed by the application 108.

At operation 362, a matter identifier is received.

At operation 364, the identifier is used to retrieve information about the matter.

At operation 366, a correspondence document associated with the matter is identified.

At operation 368, the identified correspondence document is retrieved.

At operation 370, the retrieved correspondence document is parsed to identify sections.

At operation 372, response prompts are generated based on the identified sections.

At operation 374, user inputs to the response prompts are received.

At operation 376, a response document is generated based on the user inputs.

Figure 5:
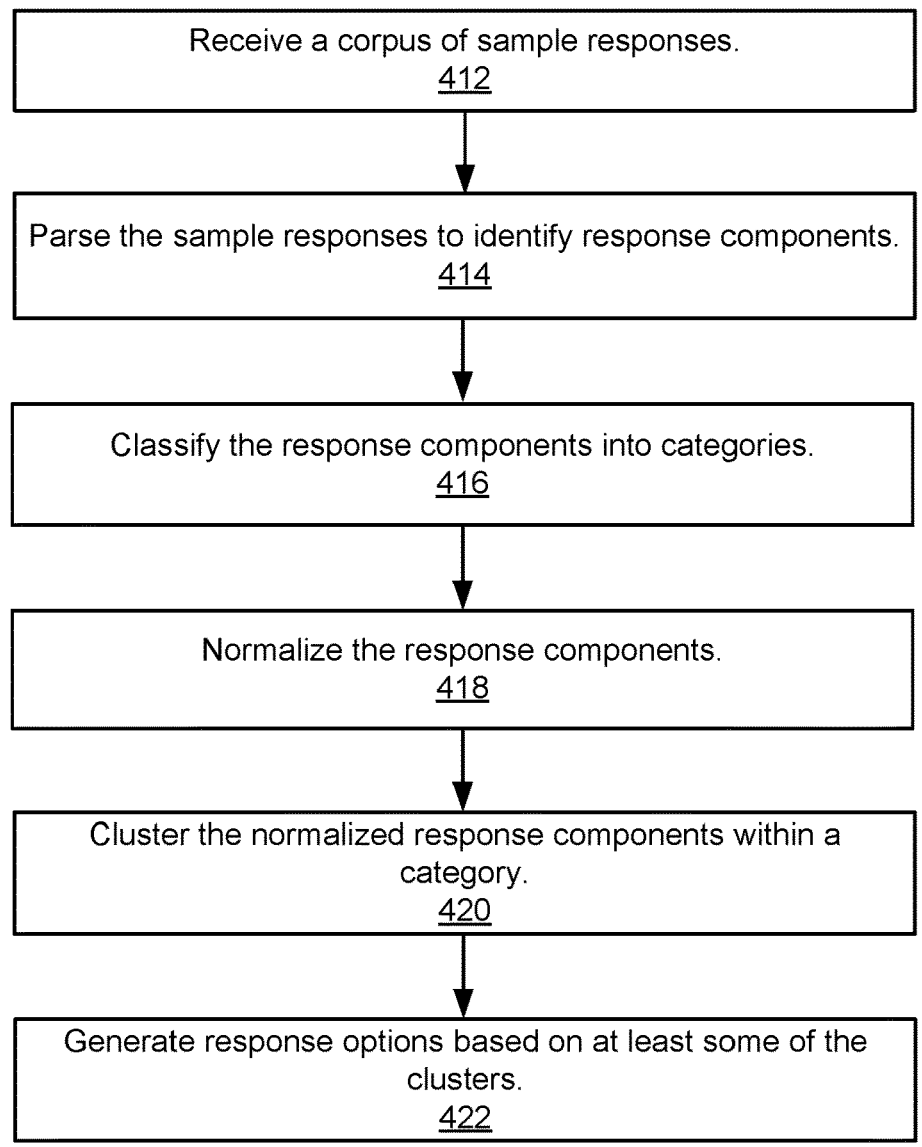
FIG. 5 is a diagram of an example method 410 of generating response options based on sample responses that may be performed by implementations of the response component clustering engine of FIG. 1.

FIG. 5 is a diagram of an example method 410 of generating response options based on sample responses. The generated response options may be stored in a database and retrieved and used to generated future response documents. The method 410 may, for example, be performed by the response component clustering engine 138.

At operation 412, a corpus of sample responses is received. Receiving the corpus of sample responses may include accessing sample responses that are stored in a data store. The corpus of sample responses may include responses prepared by many users. The corpus of sample responses may include a selected set of sample responses. For example, the set of sample responses may be selected due to an association with a specific user, attorney, client, inventor, applicant, technology area, examiner, etc.

At operation 414, the sample responses are parsed to identify response components (or response sections).

At operation 416, the response components are classified into categories. For example, the categories may correspond to the type of issue the response section addresses.

At operation 418, the response components are normalized. Normalizing response components may include replacing specific terms such as proper nouns in the response component with placeholder values. For example, the name of a reference cited in a response component may be replaced with a placeholder value. By replacing these specific values, similarities between components may be more easily identified (e.g., differences in reference names will not affect the similarity between two components).

At operation 420, the normalized response components are clustered within a category. For example, the response components may be clustered using k-means clustering. In some implementations, a k value in the range of 3-5 is used. These clusters may identify groups of similar response components, which each may be associated with using a specific strategy.

At operation 422, response options are generated based on at least some of the clusters. In some implementations, a machine learning model may be used to generate a score for the response options. For example, the machine learning model may associate the response option with a likelihood of success score based on analyzing outcomes of response documents that have been used that include the response option. For example, if the outcomes may be determined based on analyzing correspondence that occurred after using the response document. In some implementations, the score may be based on the outcomes of responses that includes the responses in the cluster (which may be weighted based on similarity to the generated response option).a Referring now to FIGS. 6A-6D, schematic diagrams of example user interface screens that may be generated by the user interface 120 are shown. In some implementations, user interface screens generated by the user interface 120 are transmitted to and displayed by the client application 142. In this example, an implementation of the application 108 communicates with a user to generate a response via a chat-like interface.

Figure 6:
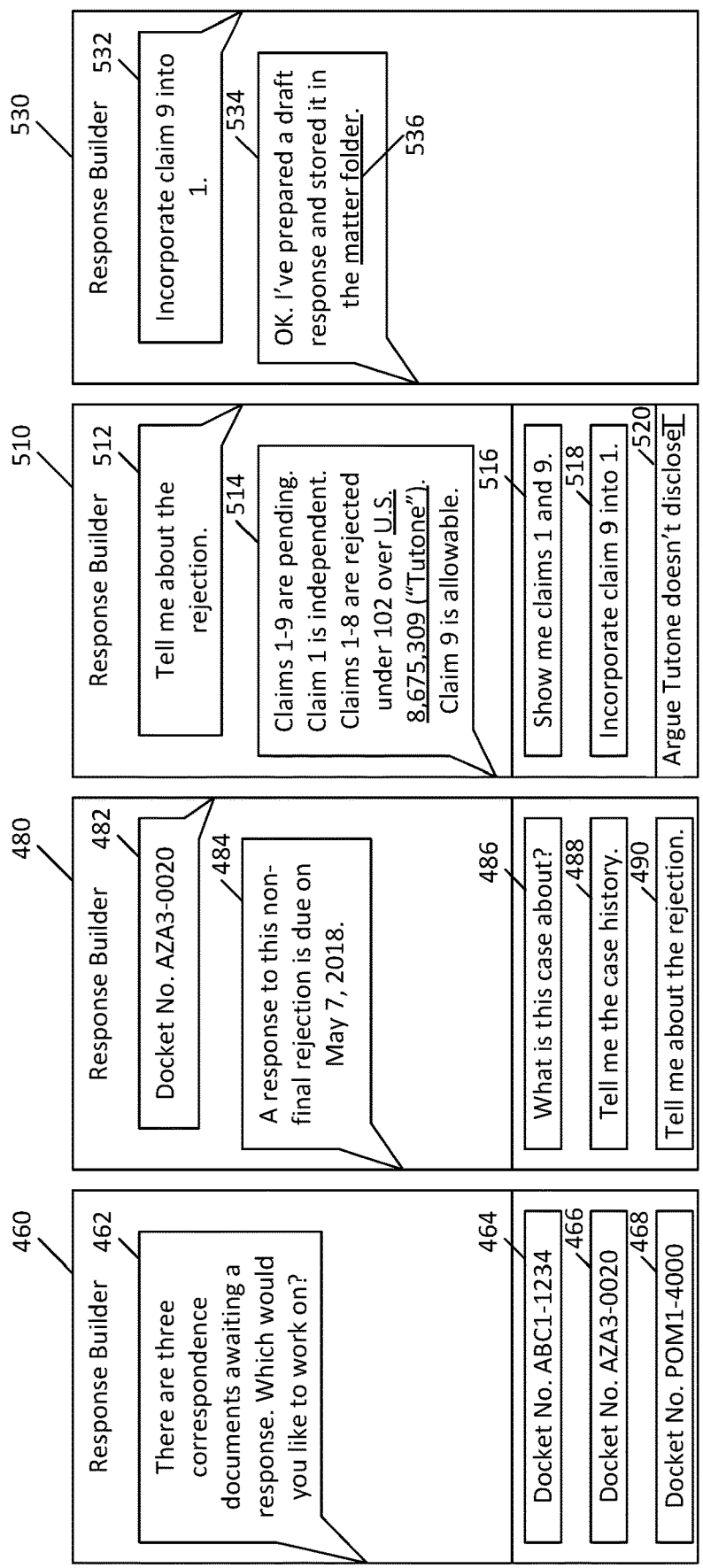
FIGS. 6A-6D are schematic diagrams of example user interface screens that may be generated by implementations of the user interface of FIG. 1.

FIG. 6A includes a user interface screen 460. The user interface 460 includes a prompt 462 and user input controls 464, 466, and 468. In this example, the prompt 462 includes information about the number of matters for which correspondence have been received. The text of the prompt 462 may be generated based on querying a database of matters associated with or assigned to a specific user. In some implementations, the status of the matters is determined by querying an API or web service provided by a server computing device (e.g., such as a server provided by a government patent office, or a third-party service that mirrors or provides access to data generated by a government patent office).

The user input controls 464, 466, and 468 may also be generated based on querying the database. In this example, each of the user input controls 464, 466, and 468, is associated with a matter number for which a response is due. In this example, matter numbers (docket numbers) are shown on the user input controls. In some implementations, other information may be shown too, such as the type of correspondence (e.g., a non-final office action, a final office action, a restriction requirement, an advisory action, a notice of allowance), a title (or other description), and when a response is due. Responsive to the actuation of one of the user input controls, 464, 466, and 468, a matter may be selected for proceeding. Textual information based on the selection may be shown in sequence as a message from the user to the application 108.

Referring now to FIG. 6B, an example user interface screen 480 is shown. The user interface screen 480 may be shown after a selection from a user is received on the user interface screen 460 shown in FIG. 6A. The user interface screen 480 includes an input selection message 482, a prompt 484, and user input controls 486, 488, and 490. The information shown in the prompt 484 and on the user input controls 486, 488, and 490 may be generated based on information stored in a database that is accessible to the application 108.

In this example, the input selection message 482 shows a docket number associated with a matter that the user selected by actuating the user input control 466 on the user interface screen 460 (see FIG. 6A). The prompt 484 provides additional information about a correspondence from the selected matter for which a response is due. In this case, the prompt 484 includes the text "A response to this non-final rejection is due on May 7, 2018." The user input controls 486, 488, and 490 include various response messages that can be provided to the application 108 to instruct the application 108 to take a particular action.

In this example, the user input control 486 includes the text "What is this case about?" In some implementations, upon actuation, a brief summary of the matter may be provided. For example, the title or abstract may be provided. In some implementations, a summary of the claims or a summary of the specification is provided. These summaries may be generated using a machine learning module that performs natural language processing on the text of the claims or specification to identify representative terms or phrases.

The user input control 488 includes the text "Tell me the case history." Upon actuation of user input control 488, a summary of the prosecution history for the matter may be provided. For example, the number of rejections that have been received may be provided. In some implementations, a summary of the differences between the current correspondence and a preceding correspondence may also be provided (e.g., a list of issues that have or have not been overcome).

The user input control 490 includes the text "Tell me about the rejection." Upon actuation of the user input control 490, a listing of the issues in the correspondence may be provided.

Referring now to FIG. 6C, an example user interface screen 510 is shown. The user interface screen 510 may be shown after a selection from a user is received on the user interface screen 480 shown in FIG. 6B. The user interface screen 510 includes an input selection message 512, a prompt 514, user input controls 516 and 518, and a text entry field 520.

In this example, the input selection message 512 includes the text "Tell me about the rejection" and is shown in response to actuation of the user input control 490 on the user interface screen 480 (see FIG. 6B). The prompt 514 provides a summary of the issues identified in the correspondence for the selected matter. Here, the prompt 514 includes the text "Claims 1-9 are pending. Claim 1 is independent. Claims 1-8 are rejected under 102 over U.S. Pat. No. 8,675,309 ("Tutone"). Claim 9 is allowable." This text may be generated by, for example, parsing the text of the correspondence. In some implementations, this text may also be generated by parsing other documents associated with the selected matter, such as a document that includes the pending claims.

The user input controls 516 and 518 include various response messages that can be provided to the application 108 to instruct the application 108 to take a particular action. In this example, the user input control 516 includes the text "Show me claims 1 and 9," and the user input control 518 includes the text "Incorporate claim 9 into 1." These options may be generated based on the issues identified in the correspondence. Upon actuation of the user input control 516, a message may be sent to the application 108 instructing the application to cause some or all of the text from claims 1 and 9 to be displayed. Upon actuation of the user input control 518, a message may be sent to the application 108 to define the strategy for the response.

In addition to the user input controls, some implementations include a text entry field in which a user can respond to the prompts by entering a textual response. For example, the text entry field 520 allows a user to type or otherwise provide textual input that may be interpreted by the application 108 as instructions for developing a strategy to generate a response document. In some implementations, keywords or instructions may be entered.

In some implementations, free form text may be used to generate additional user input controls using auto-complete technologies. These additional user input controls may be shown in addition to the user input controls 516 and 518 or as replacements for the user input controls 516 and 518.

In some implementations, after some text is entered in the text entry field 520 one or more options for completing the text entry may be displayed. In this example, the text "Argue Tutone doesn't disclose" has been entered. As an example, one or more claim elements from claim 1 may be displayed as potential options to complete the entered text. In some implementations, all of the elements are shown as options.

In some implementations, a subset of elements are shown as options. The subset of elements that are shown may be selected based on comparing the claim elements to a corpus of claim elements using a machine learning system to, for example, identify uncommon elements. In some implementations, the subset of elements is identified by comparing the claim elements to the cited references.

Referring now to FIG. 6D, an example user interface screen 530 is shown. The user interface screen 530 may be shown after a selection from a user is received on the user interface screen 510 shown in FIG. 6C. The user interface screen 530 includes an input selection message 532 and a message 534. In this example, the input selection message 532 includes the text "Incorporate claim 9 into 1" and is shown in response to actuation of the user input control 518 on the user interface screen 510 (see FIG. 6C). The message 534 includes the text "OK. I've prepared a draft response and stored it in the matter folder." The message 536 includes a link 536. The link 536 may, for example, be a hyperlink to a location where the draft response is stored.

Although FIGS. 6A-6D include example graphical chat-like user interface, other implementations may include voice or speech interface that behaves similarly. For example, the system may provide audio prompts using speech synthesis. The system may also record or listen via a microphone to speech from a user that is responsive to the prompt. The received audio input may then be processed to using natural language processing or to recognize specific keywords.

Figure 7:
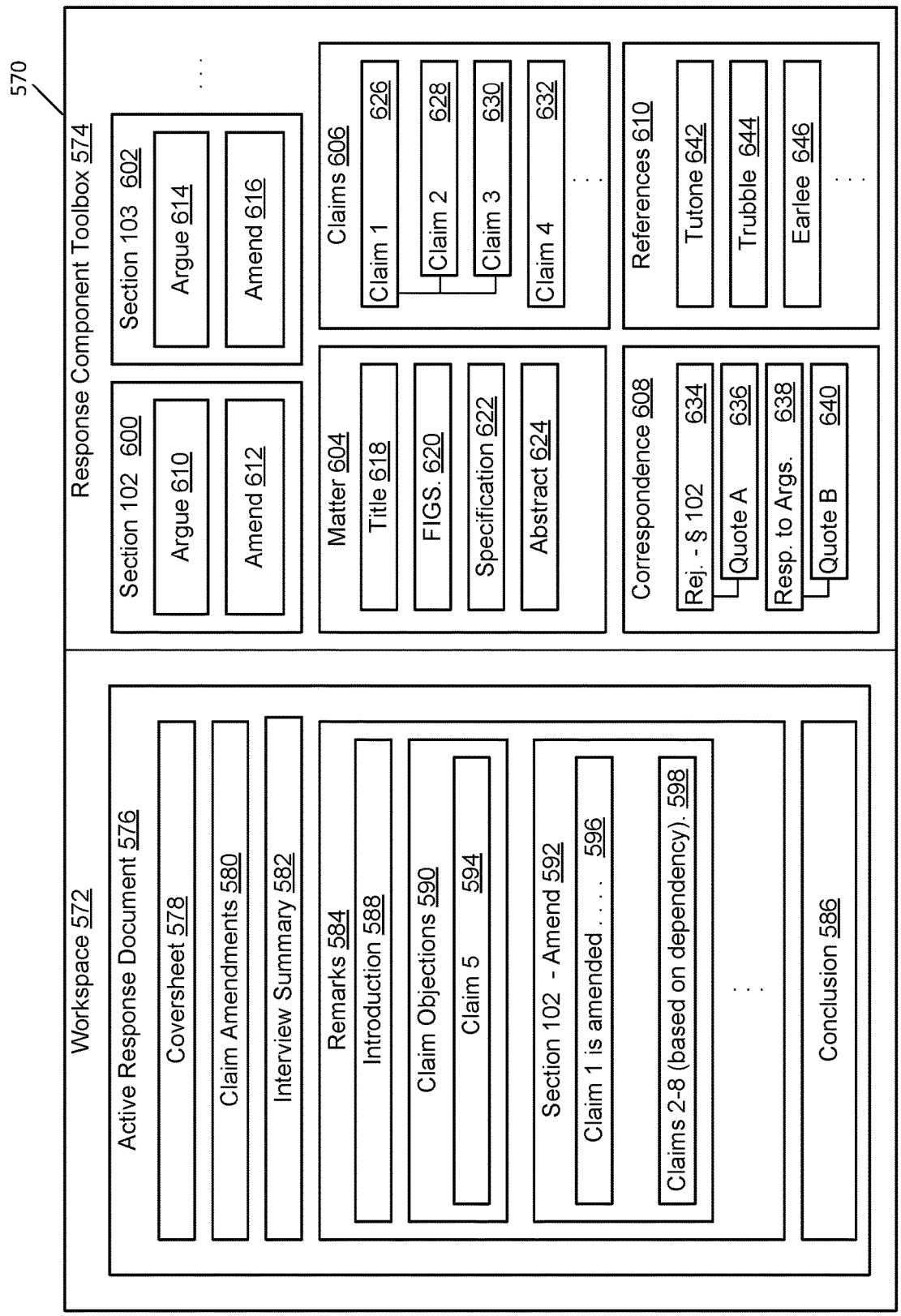
FIG. 7 is a schematic diagram of an example user interface screen that may be generated by implementations of the user interface of FIG. 1.

Referring now to FIG. 7, a schematic diagram of a user interface screen 570 is shown. The user interface screen 570 may be generated by the user interface 120 to provide a drag-and-drop interface for constructing a response. In this example, the user interface screen 570 includes a workspace 572 and a response component toolbox 574. The workspace 572 includes an active response document 576. The active response document 576 may include graphical representations of various sections of a response document that are, for example, defined using components from the response component toolbox 574.

In this example, the active response document 576 includes section 578 ("Coversheet"), 580 ("Claim Amendments"), 582 ("Interview Summary"), 584 ("Remarks"), and 586 ("Conclusion"). Each of these sections may in turn include subsections. For example, the section 584 ("remarks") includes subsections 588 ("Introduction"), 590 ("Claim Objections"), and 592 ("Section 102—Amend"). These subsections may in turn include subsections. For example, the subsection 590 ("Claim Objections") includes a subsection 594 ("Claim 5") and the subsection 592 ("Section 102 —Amend") includes subsections 596 ("Claim 1 is amended . . . .") and 598 ("Claims 2-8 (based on dependency)").

The response component toolbox 574 may include various component groupings that group components of the same type together. In this example the response component toolbox 574, such as the component 600 ("Section 102"), 602 ("Section 103"), 604 ("Matter"), 606 ("Claims"), 608 ("Correspondence"), and 610 ("References"). These components groupings may include various response components that can be used to populate sections of the active response document 576.

The component grouping 600 includes components 610 ("Argue") and 612 ("Amend"). The component grouping 600 may, for example, include general strategies for responding to a rejection under section 102. Each of the components in the component grouping 600 may be associated with a template for responding according to the associated strategy.

The component grouping 602 includes components 614 ("Argue") and 616 ("Amend"). The component grouping 602 may, for example, include general strategies for responding to a rejection under section 103. Each of the components in the component grouping 602 may be associated with a template for responding according to the associated strategy.

The component grouping 604 includes components 618 ("Title"), 620 ("FIGS."), 622 ("Specification"), and 624 ("Abstract"). The components in the component grouping 604 may be extracted from documents associated with the matter, such as a patent application. Each of the components may include citations, quotes, or images from the identified section of the patent application.

The component grouping 606 includes components 626 ("Claim 1"), 628 ("Claim 2"), 630 ("Claim 3"), and 632 ("Claim 4"). The components in the component grouping 606 may be extracted from a current claim listing associated with the matter. In some implementations, the components in the component grouping 606 are displayed in a tree structure based on claim dependency relationships.

The component grouping 608 includes components 634 ("Rej.—§ 102"), 636 ("Quote A"), 638 ("Resp. to Args."), and 640 ("Quote B"). The components in the component grouping 608 may be extracted from the correspondence document. In some implementations, the components are extracted using machine learning techniques. Each of the components may be associated with a citation to the correspondence document. In some implementations, the components may be associated with the rejection text from the correspondence document or a quote from the correspondence document (e.g., a quote that explains a rejection, or acknowledges that a reference does not disclose a reference).

The component grouping 610 includes components 642 ("Tutone"), 644 ("Trubble"), and 646 ("Earlee"). The components in the component grouping 610 may be associated with references cited in the correspondence document. The components of the component grouping 610 may be extracted from the correspondence document or may be entered via user input. Each of the components may be associated with a citation to the correspondence document. In some implementations, the components are also associated with portions of a reference such as paragraphs cited in the correspondence.

The components and component groupings illustrated and described herein are just examples and other implementations include other component groupings and other components.

The active response document 576 can be constructed by dragging-and-dropping components from the response component toolbox 574. The components can be arranged within the active response document 576 and can be combined to form the response text. In some implementations, an outline for the active response document 576 is generated by parsing the correspondence document. A user may then fill in the outline by dragging-and-dropping sections from the response component toolbox 574. In other implementations, the active response document 576 is initially blank and is then populated via user inputs to drag-and-drop sections from the response component toolbox 574.

Figure 8:
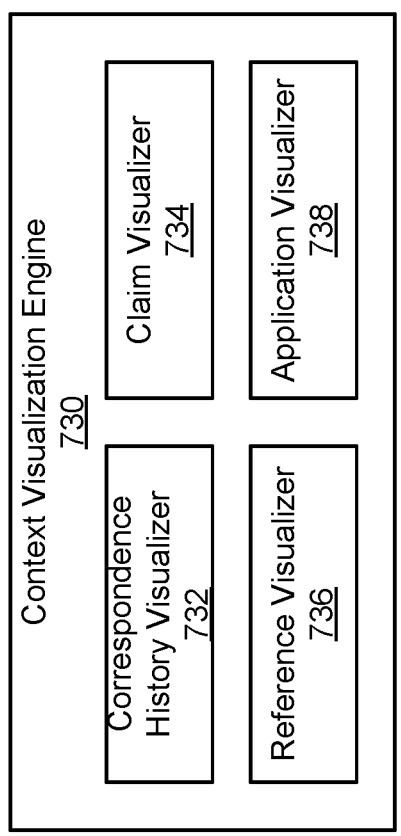
FIG. 8 is a schematic diagram of an example embodiment of the context visualization engine of FIG. 1.

Referring now to FIG. 8, a schematic diagram of an example context visualization engine 730 is shown. The context visualization engine 730 is an example of the context visualization engine 134.

In some implementations, the context visualization engine 730 includes a correspondence history visualizer 732, a claim visualizer 734, a reference visualizer 736, and an application visualizer 738.

The correspondence history visualizer 732 may visualize a correspondence history for the selected matter. For example, the visualization may include a summary of the rejections, claim status, and amendments made through the correspondence history.

The claim visualizer 734 may visualize the current rejections of the claims. For example, each element of a claim may be displayed in a manner associated with the claim status and the specific details regarding the element provided in the correspondence. For example, the text of various claim elements may be shown in different colors that are associated with different references cited in the correspondence.

The reference visualizer 736 may generate a visualization of the references cited in a correspondence. In some implementations, the visualization includes a textual summary of the reference and quotes from portions of the reference based on citations in the correspondence. The visualization may also include figures or other portions of the references that are determined to be relevant to the portions that are cited in the correspondence.

The application visualizer 738 may generate a visualization of a patent application associated with the correspondence. For example, the visualization may include figures or specification portions that are definitional or explanatory to claim terms.

Some implementations include a text editor that includes auto-complete capabilities. The auto-complete may operate on a word, phrase, sentence, or paragraph level. In some implementations, an auto-complete machine learning model is selected based on the section of the response document and then used to generate auto-complete suggestions within that section. Some of the auto-complete suggestions may be template suggestions that include fields. The fields of the template suggestions may be populated based on information from the correspondence (e.g., a reference cited or a claim number).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Further implementations are described in the following examples:

Example 1

A method comprising: parsing a correspondence document to identify document sections; generating response options based on an identified document section of the identified document sections; generating a user interface with a user-actuatable selection input associated with at least some of the response options; receiving, via the user-actuatable selection input of the user interface, a user input to select a response option; and generating a response document based on the received user input.

Example 2

The method of example 1, wherein the parsing the correspondence document to identify document sections includes: identifying portions of the correspondence document that match a specified pattern using a regular expression; and identifying the document sections based on the identified portions.

Example 3

The method of example 2, wherein the parsing the correspondence document to identify document sections further includes extracting a field value from the portion of the correspondence document that matches the specified pattern.

Example 4

The method of example 3, wherein the generating response options based on the identified document sections includes generating at least one response option that includes the field value extracted from the portion of the correspondence document that matches the specified pattern.

Example 5

The method of example 1, wherein the parsing a correspondence document to identify document sections includes: identifying a plurality of headers in a correspondence document using a first set of regular expressions; identifying a document section based on a first header of the plurality of headers; associating the document section with a portion of the correspondence document between the first header and a second header of the plurality of headers; determining a document section type based on the first header; selecting a regular expression based on the determined document section type; and extracting fields from the portion of the correspondence document associated with the document section using the selected regular expression.

Example 6

The method of example 1, wherein the parsing a correspondence document to identify document sections includes: classifying portions of the correspondence documents using a machine learning model.

Example 7

The method of example 6, wherein the parsing a correspondence document to identify document sections further includes: normalizing data in the correspondence document prior to classifying the portions of the correspondence document.

Example 8

The method of example 1, further comprising: flagging a portion of the correspondence document that is not associated with an identified document section.

Example 9

The method of example 8, further comprising: selecting an alternative parsing method; and parsing the flagged portion of the correspondence document using the alternative parsing method.

Example 10

The method of example 9, wherein the selecting an alternative parsing method includes selecting an alternative parsing method based on a length of the flagged portion.

Example 11

The method of example 1, wherein the parsing a correspondence document to identify document sections includes: determining document section types for the identified document sections; determining lengths of the identified document sections; and using an anomaly detection model to identify sections having an anomalous length based on the determined document section type and determined length.

Example 12

The method of example 1, further comprising: aligning a known textual sequence to the text of the correspondence document to identify an alignment region of the correspondence document; and identifying an insertion in the alignment region, the insertion including text that is not part of the known textual sequence.

Example 13

The method of example 12, further comprising causing the user interface to display the identified insertion separate from the correspondence document.

Example 14

The method of example 13, further comprising causing the user interface to display a uniform resource locator that is generated based on the identified insertion.

Example 15

The method of example 12, wherein the aligning a known textual sequence to the text of the correspondence document includes aligning the known textual sequence using the basic local sequence alignment technique.

Example 16

The method of example 12, wherein the known textual sequence is from a separate document associated with the correspondence document.

Example 17

The method of example 12, wherein the known textual sequence is a patent example from a patent application associated with the correspondence document.

Example 18

The method of example 1, further comprising, responsive to receiving a user input to select a response option, causing the user interface to display a user input field that is identified based on the selected response option.

Example 19

The method of example 1, wherein the user-actuatable selection input associated with at least some of the response options presents the response options in an order based on scores associated with the response options, the scores being generated by a machine learning model.

Example 20

The method of example 1, wherein the generating response options based on the identified document section includes generating at least one response option that includes text generated based on fields associated with the identified document sections.

Example 21

The method of example 1, wherein the generating response options based on the identified document section includes generating at least one response option that includes text generated based on field values extracted from the text of the identified document sections.

Example 22

The method of claim 1, wherein the generating response options based on the identified document section includes: retrieving a first document, the first document being associated with and different than the correspondence document; identifying a second document, the second document being identified based on text of the identified document section; identifying a dissimilar portion of the first document based on comparing the first document to the second document; and generating a response option based on the dissimilar portion.

Example 23

The method of example 22, wherein the identifying a dissimilar portion of the first document based on comparing the first document to the second document includes: generating word embeddings for a portion of the first document based on semantic understanding of text in the portion of the first document; and generating word embeddings for a portion of the second document based on semantic understanding of text in the portion of the second document
Example 24: The method of example 1, wherein the generating response options based on the identified document section includes generating a response option that includes a portion of known textual sequence from a document associated with the correspondence document, the portion being selected based on a machine learning model trained to identify uncommon portions.

Example 25

The method of example 1, wherein the generating response options based on the identified document sections includes generating response options that include content that is responsive to the identified document sections.

Example 26

The method of example 1, wherein the generating response options based on the identified document sections includes generating response options that include formatted textual content that is generated based on the identified document sections.

Example 27

The method of example 1, wherein the generating response options based on the identified document sections includes generating response options that include formatted textual content that includes field values extracted from the identified document sections.

Example 28

The method of example 27, wherein the generating response options based on the identified document sections includes generating response options using a response template.

Example 29

The method of example 1, wherein the generating response options based on the identified document sections includes generating response options that include formatted textual content that is generated based on data extracted from an additional document, the additional document being different than the correspondence document.

Example 30

The method of example 1, wherein the generating response options based on the identified document sections includes selecting a subset of response options from a data store of response options, the response options being selected based on a user identifier and a document section type of the identified document section.

Example 31

The method of example 1, further comprising: receiving a user input that specifies a user identifier, the user identifier being associated with a user that is different than the user providing the user input; and responsive to receiving the user input that specifies the user identifier, updating a response option based on the user identifier.

Example 32

The method of example 1, wherein the generating a response document based on the received user input includes: generating a plurality of response sections based on a single received user input, wherein each of the plurality of response sections corresponds to a different identified section of the correspondence document; and combining the plurality of response sections.

Example 33

The method of example 1, wherein the generating response options based on the identified document sections includes retrieving response options from a datastore of response options generated using a machine learning model from a corpus of responses.

Example 34

The method of example 33, wherein the datastore of response options is generated using a machine learning model from a corpus of response documents includes response options that were generated by: dividing response documents of the corpus of response documents into response sections; normalizing the response sections; and clustering the response sections.

Example 35

A method comprising: extracting response sections from a corpus of response documents; clustering the response sections based on similarity into a plurality of clusters; and generating a response option for a cluster of the plurality of clusters.

Example 36

The method of example 35, wherein the extracting response sections includes: identifying two headers within the response document; and extracting at least a portion of the response document disposed between the two headers.

Example 37

The method of example 36, wherein the identifying two headers within the response document includes identifying the two headers within the response document based at least in part on formatting of the response document.

Example 38

The method of example 36, wherein the identifying two headers within the response document includes identifying the two headers within the response document using a machine learning model trained to identify headers.

Example 39

The method of example 36, wherein the identifying two headers within the response document includes identifying the two headers within the response document using a regular expression.

Example 40

The method of example 36, wherein the extracting response sections further includes identifying a response section type of the extracted portion of the response document.

Example 41

The method of example 40, wherein the identifying a response section type of the extracted portion of the response document includes determining the response section type based on a header selected from the two headers, the header preceding the extracted portion of the response document.

Example 42

The method of example 40, wherein the identifying a response section type of the extracted portion of the response document includes determining the response section type by classifying the extracted portion with a machine learning model.

Example 43

The method of example 40, wherein the clustering the response sections based on similarity into a plurality of clusters includes: selecting response sections have the same response section type; and clustering the selected response sections based on similarity into a plurality of clusters.

Example 44

The method of example 40, wherein the clustering the response sections based on similarity into a plurality of clusters includes normalizing the extracted response sections.

Example 45

The method of example 44, wherein the normalizing the extracted response sections includes replacing specific terms with placeholder values.

Example 46

The method of example 44, wherein the clustering the response sections based on similarity into a plurality of clusters includes generating word embeddings for the normalized response sections.

Example 47

The method of example 46, wherein the generating word embeddings for the normalized response sections includes applying word2vec to the normalized response sections.

Example 48

The method of example 46, wherein the clustering the response sections based on similarity into a plurality of clusters includes clustering the response sections using k-means clustering.

Example 49

The method of example 35, wherein each cluster of the plurality of clusters is associated with multiple response sections, and the generating a response option for a cluster of the plurality of clusters includes selecting an example response from the multiple response sections associated with the cluster.

Example 50

The method of example 49, wherein the selecting an example response from multiple response sections associated with the cluster includes selecting a response section that minimizes the similarity distance to the other response sections associated with the cluster.

Example 51

A method comprising: receiving a correspondence document; identifying amendment indicators within the correspondence document; identifying textual content of the correspondence document; generating a pending representation of at least a portion of the correspondence document based on the amendment indicators and the textual content.

Example 52

The method of example 51, wherein the correspondence document includes one or more images.

Example 53

The method of example 52, further comprising generating a textual representation of the correspondence document.

Example 54

The method of example 53, wherein the generating a textual representation of the correspondence document includes performing optical character recognition on the correspondence document.

Example 55

The method of example 54, wherein the performing optical character recognition on the correspondence document includes performing optical character recognition on the correspondence document using a machine learning model that is configured to recognize characters that include text effects.

Example 56

The method of example 55, wherein the machine learning model is configured to distinguish characters that include text effects from characters that do not include text effects.

Example 57

The method of example 56, wherein the machine learning model configured to distinguish characters that include text effects from characters that do not include text effects includes a machine learning model that has been trained to classify characters that have text effects as separate characters from characters that do not have text effects.

Example 58

The method of example 55, wherein the text effects include strikethroughs.

Example 59

The method of example 55, wherein the text effects include underlines.

Example 60

The method of example 55, further comprising: deleting characters that include text effects that are associated with deletion; and replacing characters that include text effects associated with insertions with corresponding unannotated characters.

Example 61

The method of example 51, wherein the identifying amendment indicators within the correspondence document includes: identifying a horizontal line within the correspondence document; storing a location of the identified horizontal line within the correspondence document; removing the horizontal line from the correspondence document; after removing the horizontal line, generating a textual representation of the correspondence document; and identifying a portion of the textual representation associated with the location of the identified horizontal line.

Example 62

The method of example 61, wherein the identifying amendment indicators within the correspondence document further includes: determining a relative vertical position of the horizontal line with respect to the identified portion of the textual representation; and determining an amendment indicator type based on the relative vertical position.

Example 63

The method of example 62, wherein determining an amendment indicator type includes determining the amendment indicator is a deletion amendment indicator.

Example 64

The method of example 63, further comprising: responsive to determining the amendment indicator is a deletion amendment indicator, occluding a region of the correspondence document at the location of the horizontal line; and after occluding the line of text, generating a textual representation of the correspondence document.

Example 65

A non-transitory computer-readable storage medium comprising instructions stored thereon that, when executed by at least one processor, cause a computing system to perform the method of any of examples 1-64.

Example 66

A computing device comprising: at least one processor; and memory storing instructions that, when executed by the at least one processor, cause the computing device to perform the method of any of examples 1-64.

While certain features of the described implementations have been illustrated as described herein, many modifications, substitutions, changes and equivalents will now occur to those skilled in the art. It is, therefore, to be understood that any appended claims are intended to cover all such modifications and changes as fall within the scope of the embodiments.

What is claimed is:

1. A method comprising:
parsing a correspondence document to identify document sections, the parsing including:
identifying a plurality of headers in the correspondence document using a first set of regular expressions;
identifying a document section based on a first header of the plurality of headers;
associating the document section with a portion of the correspondence document between the first header and a second header of the plurality of headers;
determining a document section type based on the first header;
selecting a regular expression based on the determined document section type; and
extracting fields from the portion of the correspondence document associated with the document section using the selected regular expression;
generating response options based on an identified document section of the correspondence document;
generating a user interface with a user-actuatable selection input associated with at least some of the response options;
receiving, via the user-actuatable selection input of the user interface, a user input to select a response option; and
generating a response document based on the received user input.

2. The method of claim 1, further comprising:
aligning a known textual sequence to text of the correspondence document to identify an alignment region of the correspondence document; and
identifying an insertion in the alignment region, the insertion including text that is not part of the known textual sequence.

3. The method of claim 2, further comprising causing the user interface to display the identified insertion separate from the correspondence document.

4. The method of claim 2, wherein the aligning a known textual sequence to the text of the correspondence document includes aligning the known textual sequence using a basic local sequence alignment technique.

5. The method of claim 1, further comprising, responsive to receiving a user input to select a response option, causing the user interface to display a user input field that is identified based on the selected response option.

6. The method of claim 1, wherein the generating response options based on the identified document section includes generating response options that include formatted textual content that includes field values extracted from the identified document section.

7. The method of claim 1, wherein the generating a response document based on the received user input includes:
generating a plurality of response sections based on a single received user input, wherein each of the plurality of response sections corresponds to a different identified section of the correspondence document; and
combining the plurality of response sections.

8. The method of claim 1, further comprising:
responsive to receiving the user input to select the response option, causing the user interface to display a user input field that is identified based on the selected response option; and
receiving a field value user input, via the user input field;
wherein the generating the response document based on the received user input includes generating the response document based on the received user input and the field value user input.

9. The method of claim 1, wherein the generating response options based on the document section of the correspondence document includes:
generating response options based on a document section of a correspondence document based on response options from a data store of response options, the data store including response options that were generated by:
dividing response documents of a corpus of response documents into response sections;
normalizing the response sections;
clustering the response sections into a plurality of clusters; and
selecting example response options to represent each cluster of the plurality of clusters.

10. A method comprising:
parsing a correspondence document to identify document sections;
flagging a portion of the correspondence document that is not associated with any document section of the identified document sections;
selecting an alternative parsing method;
parsing the flagged portion of the correspondence document using the alternative parsing method;
generating response options based on an identified document section of the correspondence document;
generating a user interface with a user-actuatable selection input associated with at least some of the response options;
receiving, via the user-actuatable selection input of the user interface, a user input to select a response option; and
generating a response document based on the received user input.

11. The method of claim 10, wherein the parsing the correspondence document to identify document sections includes:
identifying portions of the correspondence document that match a specified pattern using a regular expression; and
identifying the document sections based on the identified portions.

12. The method of claim 11, wherein the parsing the correspondence document to identify document sections further includes extracting a field value from the portion of the correspondence document that matches the specified pattern.

13. The method of claim 12, wherein the generating response options based on the identified document section includes generating at least one response option that includes the field value extracted from the portion of the correspondence document that matches the specified pattern.

14. The method of claim 10, wherein the selecting the alternative parsing method includes selecting the alternative parsing method based on a length of the flagged portion of the correspondence document.

15. The method of claim 14, wherein the generating response options based on the identified document section includes selecting a subset of response options from a data store of response options, the subset of response options being selected based on a document section type of the identified document section.

16. A method comprising
parsing a correspondence document to identify document sections, including:
  determining a document section type for the identified document sections;
  determining lengths of the identified document sections; and
  using an anomaly detection model to identify sections having an anomalous length based on the determined document section type and determined length;
generating response options based on a document section of a correspondence document;
generating a user interface with a user-actuatable selection input associated with at least some of the response options;
receiving, via the user-actuatable selection input of the user interface, a user input to select a response option; and
generating a response document based on the received user input.

17. A method comprising:
generating response options based on a document section of a correspondence document;
generating a user interface with a user-actuatable selection input associated with at least some of the response options, wherein the user-actuatable selection input associated with at least some of the response options presents the response options in an order based on scores associated with the response options, the scores being generated by a machine learning model;
receiving, via the user-actuatable selection input of the user interface, a user input to select a response option; and
generating a response document based on the received user input.

18. The method of claim 17, wherein the generating response options based on the document section includes generating at least one response option that includes text generated based on fields associated with the document sections.

19. A method comprising:
generating response options based on a document section of a correspondence document, including:
  retrieving a first document, the first document being associated with and different than the correspondence document;
  identifying a second document, the second document being identified based on text of the document section;
  identifying a dissimilar portion of the first document based on comparing the first document to the second document; and
  generating a response option based on the dissimilar portion;
generating a user interface with a user-actuatable selection input associated with at least some of the response options;
receiving, via the user-actuatable selection input of the user interface, a user input to select a response option; and
generating a response document based on the received user input.

20. The method of claim 19, wherein the identifying a dissimilar portion of the first document based on comparing the first document to the second document includes:
generating word embeddings for a portion of the first document based on semantic understanding of text in the portion of the first document; and
generating word embeddings for a portion of the second document based on semantic understanding of text in the portion of the second document.

\* \* \* \* \*